United States Patent [19]
Sano et al.

[11] Patent Number: 6,069,338
[45] Date of Patent: May 30, 2000

[54] METHOD AND APPARATUS FOR CONTROLLING SPOT WELDING ROBOT

[75] Inventors: Masatoshi Sano, Kakogawa; Naoyuki Matsumoto, Akashi, both of Japan

[73] Assignee: Kawasaki Jukogyo Kabushiki Kaisha, Kobe, Japan

[21] Appl. No.: 09/307,790

[22] Filed: May 10, 1999

[30] Foreign Application Priority Data

May 11, 1998 [JP] Japan .................. 10-146581

[51] Int. Cl.$^7$ ............... B23K 37/02; B23K 11/11
[52] U.S. Cl. ..................... 219/86.7; 219/86.22
[58] Field of Search ............... 219/86.7, 86.41, 219/86.22; 901/42

[56] References Cited

U.S. PATENT DOCUMENTS

| | | | |
|---|---|---|---|
| 3,708,648 | 1/1973 | Croucher | 219/109 |
| 4,722,337 | 2/1988 | Losch et al. | 219/121 |
| 4,819,184 | 4/1989 | Jonsson et al. | 901/3 |
| 4,984,171 | 1/1991 | Tsuji | 901/42 |
| 5,340,960 | 8/1994 | Takasaki et al. | 219/86.7 |
| 5,449,875 | 9/1995 | Ito et al. | 219/86.7 |
| 5,786,568 | 7/1998 | Mc Kinney | 219/400 |

FOREIGN PATENT DOCUMENTS

| | | |
|---|---|---|
| 1-0 644 014 | 3/1995 | European Pat. Off. . |
| 2 261 081 | 5/1993 | United Kingdom . |
| 2 280 135 | 1/1995 | United Kingdom . |
| WO 94/01237 | 1/1994 | WIPO . |

*Primary Examiner*—Patrick Ryan
*Assistant Examiner*—Anjan Dey
*Attorney, Agent, or Firm*—Oliff & Berridge, PLC

[57] ABSTRACT

The disclosed spot welding robot controlling method and apparatus is able to carry out an operation for pressurizing a spot welding gun without a dead time of a spot welding robot which has the spot welding gun driven by a fluid pressure. The control method includes the steps of measuring a gun closing time, measuring an axial coincidence time, calculating a time difference between the time point of the command position axial coincidence and the output time point of the pressurization command in an actual welding operation using the gun closing time and the axial coincidence time, and outputting the pressurization command to the spot welding gun at a time point which is derived by subtracting the time difference from the time point of the command position axial coincidence in the actual welding operation.

8 Claims, 2 Drawing Sheets

METHOD AND APPARATUS FOR CONTROLLING SPOT WELDING ROBOT

BACKGROUND OF THE INVENTION

1. Field of the Invention

The present invention relates to a spot welding robot controlling method and controlling apparatus. More particularly, the present invention relates to a method of controlling a spot welding robot with a spot welding gun which is driven by a fluid pressure such as pneumatics, oil hydraulics, etc., and an apparatus for embodying the same.

2. Description of the Related Art

In the related art, as shown in FIG. 3, a spot welding gun (sometimes referred to as a "gun" hereinafter) 2 is employed in a spot welding robot (sometimes referred to as a "robot" hereinafter) 60. The spot welding gun is equipped with a pair of gun tips 1 which are operated by a fluid pressure such as pneumatics, oil hydraulics, etc. By using the spot welding robot 60 with such spot welding gun 2, a spot welding is carried out by initially teaching spot welding points according to a teaching operation, then closing the spot welding gun 2 at points taught according to a reproducing operation by a robot controller 3, and then supplying a current to the gun tips 1 from a welding machine 4. Normally, a signal for closing the gun 2 (gun pressurizing signal) is output when axial coincidence of the spot welding robot 60 (current position axial coincidence) is achieved at a position which is taught previously. Also, a signal for supplying a current to the gun tips 1 (welding command signal) is output when the gun 2 has been closed, i.e., a pressurizing operation of the gun 2 has been completed (at the gun pressurization completing time point).

In this manner, according to the spot welding robot 60 in the related art, since the gun pressurizing signal is output at a time point when axial coincidence in a current position (current position axial coincidence) of the spot welding robot 60 is achieved at taught points, a time until the gun 2 has been closed is a dead time.

Therefore, various proposals have been made in order to reduce this dead time in the related art.

For example, such a proposal has been made that the gun pressurizing signal is output prior to axial coincidence where a command position (command position axial coincidence) of the spot welding robot 60 is achieved. However, according to a method in this proposal, it has been apparent that such a phenomenon is caused depending upon spot welding points that either the pressurization to the gun has been completed after the current position axial coincidence, or conversely the pressurization to the gun has been completed prior to the current position axial coincidence. The reason for this phenomenon may be supposed as follows. That is, the equal time is set to all spot welding points to output the gun pressurizing signal, nevertheless a time required from the command position axial coincidence to the current position axial coincidence is varied depending upon differences in moving routes, welding positions, etc. of the spot welding robot 60. Where the wording "command position axial coincidence" signifies that the command position coincides with the welding point, and the wording "current position axial coincidence" signifies that actual position of the spot welding robot 60 coincides with the welding point. As a result, according to a method by this proposal, it is impossible to complete the pressurization to the spot welding gun 2 at a time point when the current position axial coincidence is achieved at all spot welding points.

In Japanese Patent Application Publication (KOKAI) Hei 6-23561, there has been proposed a spot welding robot controlling method wherein a time ranging from a time point when the pressurization command is output from the robot controller to the spot welding gun to a time point when the pressurization to the spot welding gun is completed is measured in advance and then stored in the robot controller, then a moving time needed to position the spot welding robot is calculated every time when a positioning operation for the spot welding is commenced, then difference between the moving time and the above-mentioned time is calculated, and then the pressurization command is output to the gun at a time point when the above-mentioned time difference has been passed after starting of the positioning operation. However, the moving time of the spot welding robot is derived by virtue of calculation in this proposal, i.e., the time calculated based on an arrival time of the command position is utilized as the moving time, but the actual motion of the spot welding robot is started in answer to the command position with slight delay due to delay in a servo system, etc. Therefore, there has been a problem such that, if the starting time for the pressurization to the gun is set by using the moving time which is calculated based on the command position, the pressurization to the gun is completed before the spot welding robot reaches to the taught position. In addition, there has been the problem that, since the pressurizing time is set as an average value which is calculated after the pressurizing time has been measured by pressurizing the spot welding gun several times, such pressurizing time cannot respond to variation in time caused by the gun positions, the moving routes of the gun, abrasion of the gun tips, or the like. Moreover, there has been the problem that, since this measurement must be executed in an off-line mode, measuring operations become troublesome and complicated.

In Japanese Patent Application Publication (KOKAI) Hei 6-47562, there has been proposed a spot welding method wherein, in the situation that a gun ON command is issued during a robot job in the spot welding robot, the gun ON command is output to the spot welding power supply only when a difference between a target value instructed by the robot and a current position is within a certain range and also an actual speed of the robot is less than a predetermined value. However, although the gun ON command is output only when the difference between the target value and the current position is within the certain range and the actual speed of the robot is less than the predetermined value, it is not checked in this proposal whether or not a current position of the robot has reached the target value. Therefore, there has been such a problem that it is not clear whether or not the pressurization to the gun has been completed at a time point when the current position of the robot reaches to the target value.

In Japanese Patent Application Publication (KOKAI) Hei 7-136775, there has been proposed a spot welding equipment which comprises a robot; a welding gun attached to the robot, for applying the welding force to a welded workpiece via motion of the electrode tips caused by a pressurizing air cylinder; an electromagnetic switching valve connected to the pressurizing air cylinder; a gun pressurization commanding means for outputting a pressurizing operation command to the electromagnetic switching valve based on a welding force applying characteristic of a welding gun generated by the pressurizing air cylinder before the welding gun reaches a welding position such that both the arrival of the welding gun of the robot to the welding position and the completion of the gun pressurization via the electrode tips is achieved simultaneously; and a gun pressurization release commanding means for outputting a gun pressurization releasing command to the electromagnetic switching valve based on a gun pressurization releasing characteristic of the welding gun by the pressurizing air cylinder after supply of the current to the welded workpiece has been completed such that both the start of motion of the welding gun of the robot to the succeeding welding position and the gun pressurization releasing operation via the electrode tips is achieved simultaneously. However, according to the spot welding equipment in this proposal, characteristic such as a time extending from the start of the pressurization to the completion of the gun pressurization, etc. have been derived previously based on experiments. Therefore, both the arrival of the welding gun to the welding position and the completion of the pressurization to the welding gun cannot always be achieved at the same time in the actual spot welding operation. This is because, as described above, the time required from the start of the pressurization to the welding gun to the end of the gun pressurization is varied due to the gun positions, abrasion of the gun tips, or the like in the actual spot welding state. Also, in the spot welding equipment according to this proposal, the pressurization command for the gun is issued at a predetermined time before the welding gun reaches the welding position. However, a time period during which the robot is moved from the current position to the welding position must be known to issue such pressurization command for the gun, but no mention about this respect has been made.

SUMMARY OF THE INVENTION

The present invention has been made in view of the above problems in the related art, and it is an object of the present invention to provide a spot welding robot controlling method which is able to carry out an operation for pressurizing a spot welding gun without a dead time of a spot welding robot which has the spot welding gun driven by a fluid pressure such as pneumatics, oil hydraulics, etc., and a controlling apparatus for embodying the same.

In order to overcome the above-mentioned problems, according to a first aspect of the present invention, a method of controlling a spot welding robot having a spot welding gun operated by a fluid pressure, comprises the steps of: measuring a gun closing time T2, which is equal to a time period between the output of a pressurization commanding signal and the output of a pressurization completing signal, the pressurization commanding signal instructing a closing operation of the spot welding gun to start and the gun pressurization completing signal indicating that the closing operation of the spot welding gun is completed; measuring an axial coincidence time T3, which is equal to a time period between a time of command position axial coincidence and a time of current position axial coincidence, the time of command; position axial coincidence, occurring where command position about a moving position of the spot welding robot coincides with a predetermined welding spot, and the time of current position axial coincidence, occurring when an actual moving position of the spot welding robot coincides with the predetermined welding spot; calculating a time difference, T4 between the time point of the command position axial coincidence and the output time point of the pressurization commanding signal in an actual welding operation using the gun closing time T2 and the axial coincidence time T3, based on a following equation

T4=T2−T3−T1 where T1: a predetermined time decided according to a particular spot welding operation, and pressurization commanding signal to the spot welding gun at a time point which is derived by subtracting the time difference T4 from the time point of the command position axial coincidence in the actual welding operation.

Preferably, in the method of controlling a spot welding robot, measurements of the gun closing time and of the axial coincidence time are executed during a repeating motion of the spot welding robot.

Preferably, in the method of controlling a spot welding robot, measurements of the gun closing time and of the axial coincidence time are executed every cycle of a welding operation, and the time difference applied to a succeeding cycle is calculated based on the gun closing time and the axial coincidence time measured in a current cycle.

Preferably, in the method of controlling a spot welding robot, measurements of the gun closing time and of the axial coincidence time and the calculation of the time difference effected based on the gun closing time and the axial coincidence time are executed over a predetermined number of cycles of the welding operation, and then the pressurization commanding signal is output to the spot welding gun based on a previously calculated time difference in succeeding cycles, without further measurements of the gun closing time and of the axial coincidence time.

According to a second aspect of the present invention, an apparatus for controlling a spot welding robot having a spot welding gun operated by a fluid pressure, comprises: gun open/close time measuring means for measuring a gun closing time T2, which is equal to a time period between the output of a pressurization commanding signal and the output of a pressurization completing signal, the pressurization commanding signal instructing a closing operation of the spot welding gun to start, and the pressurization completing signal indicating that the closing operation of the spot welding gun is completed; and axial coincidence time measuring means for measuring an axial coincidence time T3, which is equal to a time period between a time of command position axial coincidence and a time of current position axial coincidence, the time of command position axial coincidence, occurring when a command position about a moving position of the spot welding robot coincides with a predetermined welding spot, and the time of current position axial coincidence, occurring when an actual moving position of the spot welding robot coincides with the predetermined welding spot; wherein a time difference T4 between the time point of the command position axial coincidence and the output time point of the pressurization commanding signal in an actual welding operation is calculated using the gun closing time T2 and the axial coincidence time T3, based on a following equation

T4=T2−T3−T1 where T1: a predetermined time decided according to a particular spot welding operation, and the pressurization commanding signal is output to the spot welding gun at a time point which is derived by subtracting the time difference T4 from the time point of the command position axial coincidence in the actual welding operation.

Preferably, the apparatus for controlling a spot welding robot further comprises mode switching means for switching the spot welding gun selectively into (1) a measuring mode in which measurements are executed by the gun open/close time measuring means and the axial coincidence time measuring means and a (2) non-measuring mode in which no measurement is executed.

According to a third aspect of the present invention, a spot welding robot comprises: a spot welding gun operated by a fluid pressure; and a controlling apparatus; the controlling apparatus including, gun open/close time measuring means for measuring a gun closing time T2, which is equal to a time period between the output of a pressurization commanding signal and the output of a pressurization completing signal, the pressurization commanding signal instructing a closing operation of the spot welding gun to start, and the gun pressurization completing signal indicating that the closing operation of the spot welding gun is completed; and axial coincidence time measuring means for measuring an axial coincidence time T3, which is equal to a time period between a time of command position axial coincidence and a time of current position axial coincidence, the time of command position axial coincidence, occurring when a command position about a moving position of the spot welding robot coincides with a predetermined welding spot, and the time of current position axial coincidence, occurring when an actual moving position of the spot welding robot coincides with the predetermined welding spot; wherein a time difference T4 between the time point of the command position axial coincidence and the output time point of the pressurization commanding signal in an actual welding operation is calculated using the gun closing time T2 and the axial coincidence time T3, based on a following equation $$T4=T2-T3-T1$$

where T1: a predetermined time decided according to a particular spot welding operation, and the pressurization commanding signal is output to the spot welding gun at a time point which is derived by subtracting the time difference T4 from the time point of the command position axial coincidence in the actual welding operation.

According to a fourth aspect of the present invention, a spot welding robot system comprises: a plurality of spot welding robots; and a general controller for controlling the plurality of spot welding robots; each of the spot welding robots including a controlling apparatus, the controlling apparatus having, gun open/close time measuring means for measuring a gun closing time T2, which is equal to a time period between the output of a pressurization commanding signal and the output of a pressurization completing signal, the pressurization commanding signal instructing a closing operation of the spot welding gun to start, and the gun pressurization completing signal indicating that the closing operation of the spot welding gun is completed; axial coincidence time measuring means for measuring an axial coincidence time T3, which is equal to a time period between a time of command position axial coincidence and a time of current position axial coincidence, the time of command position axial coincidence, occurring when a command position about a moving position of the spot welding robot coincides with a predetermined welding spot, and the time of a current position axial coincidence, occurring when an actual moving position of the spot welding robot coincides with the predetermined welding spot; and mode switching means for switching the spot welding gun selectively into (1) a measuring mode in which measurements are executed by the gun open/close time measuring means and the axial coincidence time measuring means and (2) a non-measuring mode in which no measurement is executed; wherein a time difference, T4, between the time point of the command position axial coincidence and the output time point of the pressurization commanding signal in an actual welding operation is calculated using the gun closing time T2 and the axial coincidence time T3, based on a following equation $$T4=T2-T3-T1$$

where T1: a predetermined time decided according to a particular spot welding operation, the pressurization commanding signal is output to the spot welding gun at a time point which is derived by subtracting the time difference T4 from the time point of the command position axial coincidence in the actual welding operation, and the mode switching means executes a switching between the measuring mode and the non-measuring mode based on a signal supplied from the general controller.

DESCRIPTION OF THE PREFERRED EMBODIMENTS

Embodiments of the present invention will be explained in detail with reference to the accompanying drawings hereinafter. The present invention should not be limited to such embodiments of the present invention.

Figure 1:
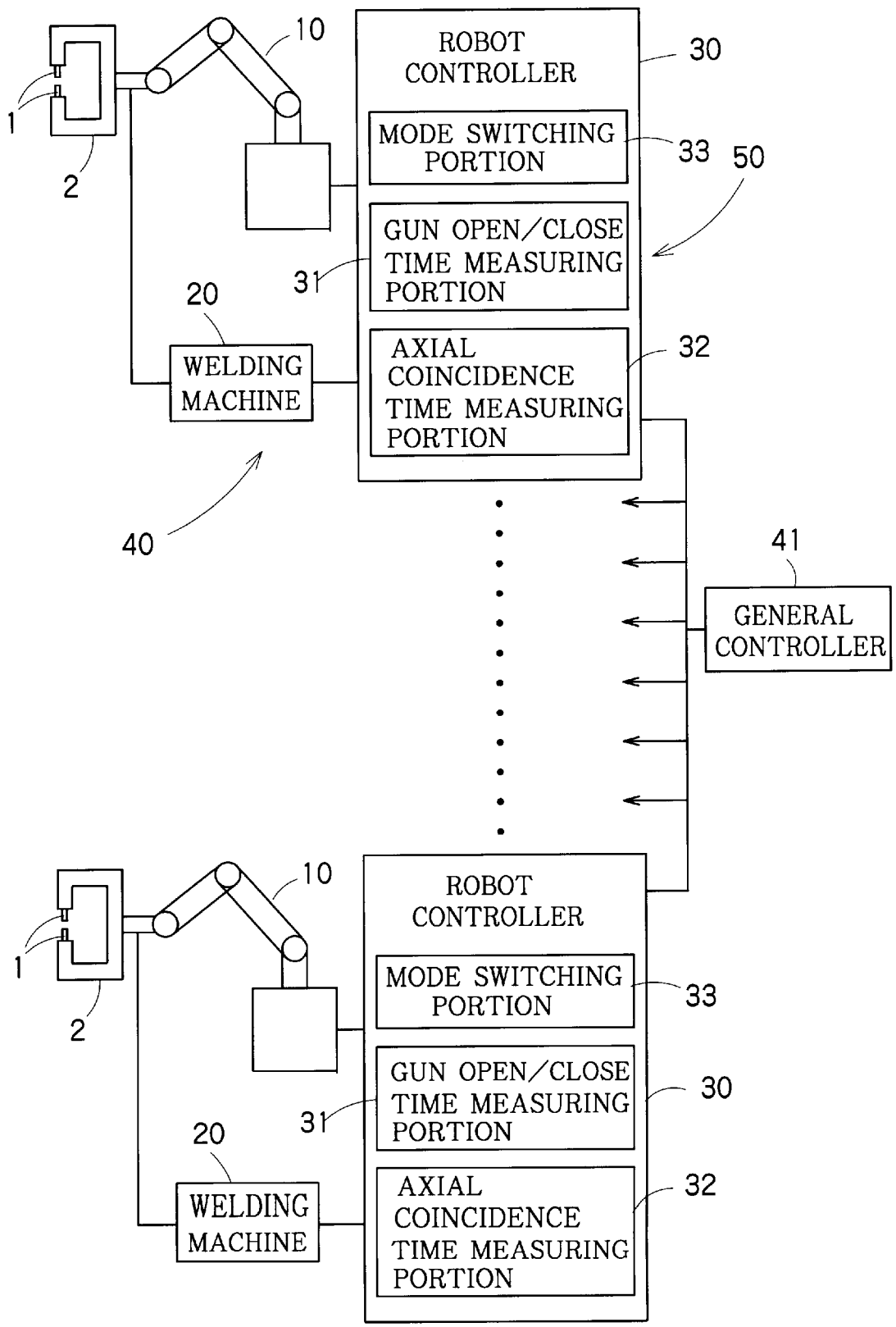
FIG. 1 is a block diagram showing a spot welding robot system with a spot welding robot controlling apparatus according to an embodiment of the present invention.

A spot welding robot controlling system 50 to which a spot welding robot controlling method according to an embodiment of the present invention is applied is shown in FIG.1 as a block diagram. As shown in FIG. 1, this controlling system 50 comprises a plurality of spot welding robots 40 and a general controller 41 for controlling the plurality of spot welding robots 40 generally, as major constituent elements. Each of the spot welding robots 40 comprises a spot welding robot main body 10 having a spot welding gun 2 to which a pair of tips 1, 1 are installed to oppose each other; a welding machine 20 for supplying a welding current to the tips 1, 1; and a robot controller (controlling apparatus) 30. In addition to functions provided to the normal robot controller 30 of the normal spot welding robot, to this robot controller 30 are provided a gun open/close time measuring portion (gun open/close time measuring means) 31 for measuring an open/close time of the spot welding gun 2, an axial coincidence time measuring portion (axial coincidence time measuring means) 32 for measuring a time from the command position axial coincidence to the current position axial coincidence (axial coincidence time), and a mode switching portion (mode switching means) 33.

In this case, the wording "command position axial coincidence" means that the command position about an operation position of the spot welding robot 40 coincides with a predetermined welding point (taught point). The wording "current position axial coincidence" also means that an actual operation position of the spot welding robot 40 coincides with the predetermined welding point (taught point). By way of supplementary explanation, if the spot welding robot 40 is moved along a route between two points, first the robot controller 30 splits the route between two points into a plurality of positional values, through which the spot welding robot 40 is moved, every control period (e.g., 16 ms). Then, the robot controller 30 outputs sequentially the previously split positions to the spot welding robot 40 every control period. These split positional values are called as the command positions. Thus, the above "command position axial coincidence" is defined as the event that the command position reaches an end point of the route between two points. Since the spot welding robot 40 is operated to follow the command positions, a motion of the spot welding robot 40 is delayed from the command position. Accordingly, when the command position is output to the end point of the route between two points, the spot welding robot 40 comes up to the end point thereafter. Thus, a time point when the spot welding robot 40 comes up to the end point is defined as the "current position axial coincidence".

The mode switching portion 33 operates to switch the spot welding gun 2 selectively into a measuring mode and a non-measuring mode. In the measuring mode, both the gun open/close time measuring portion 31 and the axial coincidence time measuring portion 32 are operated to measure a time respectively. In the non-measuring mode, the gun open/close time measuring portion 31 and the axial coincidence time measuring portion 32 are not operated.

Figure 2:
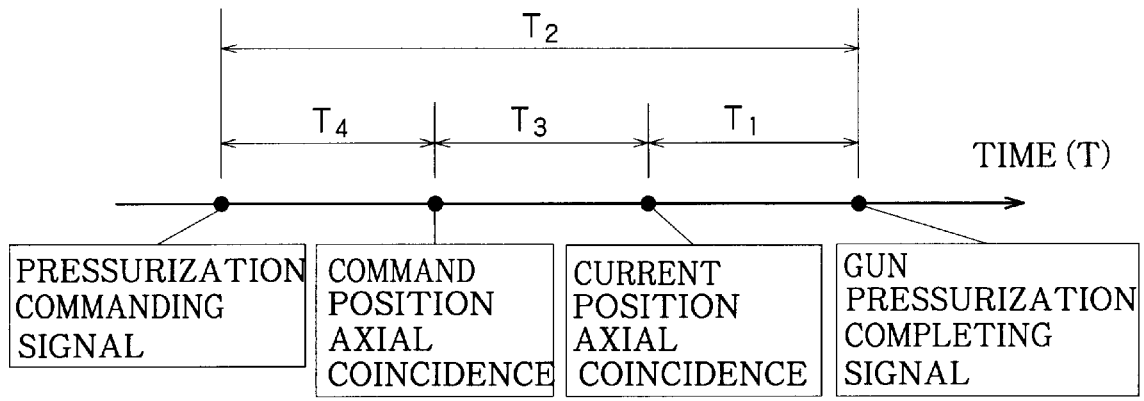
FIG. 2 is a time chart showing welding sequences in the embodiment of the present invention.
Figure 3:
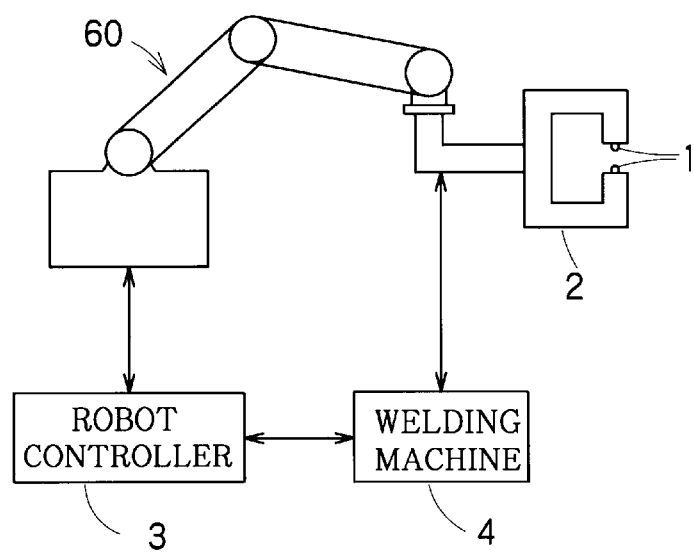
FIG. 3 is a block diagram showing a spot welding robot with a controlling apparatus in the related art.

Next, procedures in a spot welding operation carried out by the spot welding robot 40 constructed as above will be explained with reference to FIGS. 1 and 2 hereunder.

(1) First, taught points including each dotting step (step of teaching each spot as the spot welding point) are instructed.

(2) Then, the robot controller 30 is set into the measuring mode by the mode switching portion 33.

(3) Then, at the time of the first repeat operation, the axial coincidence time measuring portion 32 measures an axial coincidence time T3 in each dotting step, and also the gun open/close time measuring portion 31 measures a time (referred to as a "gun closing time" hereinafter) T2 required from the time when a gun closing start signal (pressurization commanding signal) is output in each dotting step to the time when a gun closing signal informing that the spot welding gun 2 has been closed actually (gun pressurization completing signal) is output. In this case, since the axial coincidence time has not been known previously, a gun closing start signal is output at a time point when the current position axial coincidence is achieved. Where the gun closing signal is detected based on change in the current flowing through a sensor (not shown) provided to the gun 2 or the welding machine 20. For example, such gun closing detection based on this current change is achieved such that, while flowing a weak current constantly via the tips 1, 1, the gun closing is decided at a time point when the current position is increased abruptly.

(4) With the use of the gun closing time T2 and the axial coincidence time T3 both derived in the item (3), a time difference T4 between the command position axial coincidence and the output time point of the pressurization commanding signal is calculated every dotting step according to Eq.(1) given in the following (see FIG. 2). Then, if the time difference T4 calculated based on Eq.(1) is positive, the pressurization commanding signal is output prior to the command position axial coincidence by the time difference T4. On the contrary, if the time difference T4 is negative, the pressurization commanding signal is output after the command position axial coincidence by the time difference T4.

$$T4=T2-T3-T1 \quad (1)$$

Where T1 is a constant time which is decided according to the spot welding operation such that the completion of the gun pressurization is set after the current position axial coincidence by the time T1. The reason for setting the time T1 is that, when the actual motion of the gun does not coincide with the measured time, a motion of the gun 2 should be adjusted. For example, if the time T1 is set to a negative value, the welding command is issued earlier than the actually measured time. In this case, if the time T1 is set to zero, the gun pressurization completing signal is issued at the time when the current position axial coincidence occurs.

Subsequently, the spot welding operation is applied to each workpiece in a similar way. In this case, the gun closing time T2 and the axial coincidence time T3 are measured in each spot welding operation, then the time difference T4 is calculated based on the measured gun closing time T2 and the measured axial coincidence time T3, and then the spot welding is carried out in the succeeding cycle using this calculated time difference T4.

With the above, the spot welding operation in the measuring mode has been explained, but the measuring operation can be omitted if variation in the measured values is seldom caused, e.g., in the case where the workpieces having the same profile are supplied continuously to the robot 40. In such case, the robot controller 30 of each robot 40 can be switched from the measuring mode to the non-measuring mode according to the command issued from the general controller 41, and then the spot welding is carried out based on the previously measured value.

In the event that the gun closing time T2 cannot be measured because the gun pressurization completing signal cannot be supplied from the spot welding gun 2 or the welding machine 20, the gun closing time T2 should be measured previously in the off-line mode and then the time difference T4 should be calculated based on the measured gun closing time T2 and the measured axial coincidence time T3.

The present invention has been explained as above with reference to the embodiment, but the present invention is not limited only to such embodiment and thus various modifications or variations may be applied to the present invention. For instance, although each robot 40 is switched from the measuring mode to the non-measuring mode according to the command issued from the general controller 41 in the present embodiment, switching of the robot 40 from the measuring mode to the non-measuring mode can be executed by the robot controller 30 of the robot 40 according to the utilization mode of the robot 40.

As described in detail, according to the present invention, excellent advantages can be achieved as follows.

(1) The pressurization commanding signal can be issued to the gun at an optimum timing every dotting step by measuring both the time required for the pressurization to the gun and the axial coincidence time.

(2) Since the pressurization commanding signal can be issued to the gun at the optimum timing, a cycle time of the spot welding operation can be reduced.

What is claimed is:

1. A method of controlling a spot welding robot having a spot welding gun operated by a fluid pressure, comprising the steps of:

measuring a gun closing time T2, which is equal to a time period between the output of a pressurization commanding signal and the output of a pressurization completing signal, the pressurization commanding signal instructing a closing operation of the spot welding gun to start, and the gun pressurization completing signal indicating that the closing operation of the spot welding gun is completed;

measuring an axial coincidence time T3, which is equal to a time period between a time of command position axial coincidence and a time of current position axial coincidence, the time of command position axial coincidence occurring when a command position about a moving position of the spot welding robot coincides with a predetermined welding spot, and the time of current position axial coincidence occurring when an actual moving position of the spot welding robot coincides with the predetermined welding spot;

calculating a time difference, T4, between the time point of the command position axial coincidence and the output time point of the pressurization commanding signal in an actual welding operation using the gun closing time T2 and the axial coincidence time T3, based on the following equation:

$$T4=T2-T3-T1$$

where T1: a predetermined time decided according to a particular spot welding operation; and outputting the pressurization commanding signal to the spot welding gun at a time point which is derived by subtracting the time difference T4 from the time point of the command position axial coincidence in the actual welding operation.

2. A method of controlling a spot welding robot according to claim 1, wherein measurements of the gun closing time T2 and of the axial coincidence time T3 are executed during a repeating motion of the spot welding robot.

3. A method of controlling a spot welding robot according to claim 1, wherein measurements of the gun closing time T2 and of the axial coincidence time T3 are executed every cycle of a welding operation, and the time difference T4 applied to a succeeding cycle is calculated based on the gun closing time T2 and the axial coincidence time T3 measured in a current cycle.

4. A method of controlling a spot welding robot according to claim 1, wherein measurements of the gun closing time T2 and of the axial coincidence time T3 and the calculation of the time difference T4 are executed over a predetermined number of cycles of the welding operation, and then the pressurization commanding signal is output to the spot welding gun based on a previously calculated time difference T4 in succeeding cycles, without further measurements of the gun closing time T2 and of the axial coincidence time T3.

5. An apparatus for controlling a spot welding robot having a spot welding gun operated by a fluid pressure, comprising:

gun open/close time measuring means for measuring a gun closing time T2, which is equal to a time period between the output of a pressurization commanding signal and the output of a pressurization completing signal, the pressurization commanding signal instructing a closing operation of the spot welding gun to start, and the gun pressurization completing signal indicating that the closing operation of the spot welding gun is completed; and axial coincidence time measuring means for measuring an axial coincidence time T3, which is equal to a time period between a time of command position axial coincidence and a time of current position axial coincidence, the time of command position axial coincidence occurring when a command position about a moving position of the spot welding robot coincides with a predetermined welding spot, and the time of current position axial coincidence occurring when an actual moving position of the spot welding robot coincides with the predetermined welding spot;

wherein a time difference T4, between the time point of the command position axial coincidence and the output time point of the pressurization commanding signal in an actual welding operation is calculated using the gun closing time T2 and the axial coincidence time T3, based on the following equation:

$$T4=T2-T3-T1$$

where T1: a predetermined time decided according to a particular spot welding operation; and the pressurization commanding signal is output to the spot welding gun at a time point which is derived by subtracting the time difference T4 from the time point of the command position axial coincidence in the actual welding operation.

6. An apparatus for controlling a spot welding robot according to claim 5, further comprising mode switching means for switching the spot welding gun selectively into: (1) a measuring mode in which measurements are executed by the gun open/close time measuring means and the axial coincidence time measuring means, and (2) a non-measuring mode in which no measurement is executed.

7. A spot welding robot comprising:

a spot welding gun operated by a fluid pressure; and a controlling apparatus;

the controlling apparatus including:

gun open/close time measuring means for measuring a gun closing time T2, which is equal to a time period between the output of a pressurization commanding signal and the output of a pressurization completing signal, the pressurization commanding signal instructing a closing operation of the spot welding gun to start, and the gun pressurization completing signal indicating that the closing operation of the spot welding gun is completed; and axial coincidence time measuring means for measuring an axial coincidence time T3, which is equal to a time period between a time of command position axial coincidence and a time of current position axial coincidence, the time of command position axial coincidence occurring when a command position about a moving position of the spot welding robot coincides with a predetermined welding spot, and the time of current position axial coincidence occurring when an actual moving position of the spot welding robot coincides with the predetermined welding spot;

wherein a time difference, T4 between the time point of the command position axial coincidence and the output time point of the pressurization commanding signal in an actual welding operation is calculated using the gun closing time T2 and the axial coincidence time T3, based on the following equation:

$$T4=T2-T3-T1$$

where T1: a predetermined time decided according to a particular spot welding operation; and the pressurization commanding signal is output to the spot welding gun at a time point which is derived by subtracting the time difference T4 from the time point of the command position axial coincidence in the actual welding operation.

8. A spot welding robot system comprising:

a plurality of spot welding robots; and a general controller for controlling the plurality of spot welding robots;

each of the spot welding robots including a controlling apparatus, the controlling apparatus having:

gun open/close time measuring means for measuring a gun closing time T2 which is equal to a time period between the output of a pressurization commanding signal and the output of a pressurization completing signal, the pressurization commanding signal instructing a closing operation of the spot welding gun to start, and the gun pressurization completing signal indicating that the closing operation of the spot welding gun is completed;

axial coincidence time measuring means for measuring an axial coincidence time T3, which is equal to a time period between a time of command position axial coincidence and a time of current position axial coincidence, the time of command position axial coincidence occurring when a command position about a moving position of the spot welding robot coincides with a predetermined welding spot, and the time of current position axial coincidence occurring when an actual moving position of the spot welding robot coincides with the predetermined welding spot; and mode switching means for switching the spot welding gun selectively into: (1) a measuring mode in which measurements are executed by the gun open/close time measuring means and the axial coincidence time measuring means, and (2) a non-measuring mode in which no measurement is executed;

wherein a time difference, T4, between the time point of the command position axial coincidence and the output time point of the pressurization commanding signal in an actual welding operation is calculated using the gun closing time T2 and the axial coincidence time T3, based on the following equation:

$$T4=T2-T3-T1$$

where T1: a predetermined time decided according to a particular spot welding operation;

the pressurization commanding signal is output to the spot welding gun at a time point which is derived by subtracting the time difference T4 from the time point of the command position axial coincidence in the actual welding operation, and the mode switching means executes a switching between the measuring mode and the non-measuring mode based on a signal supplied from the general controller.

* * * * *